United States Patent [19]

Sano et al.

[11] 4,401,076
[45] Aug. 30, 1983

[54] FUEL INJECTION CONTROL SYSTEM FOR ELECTROMAGNETIC VALVE-CONTROLLED FUEL INJECTION PUMP OF DIESEL ENGINE

[75] Inventors: Yukinori Sano, Katsuta; Yoshikazu Hoshi, Ibaraki; Ikuo Takahashi, Katsuta, all of Japan

[73] Assignees: Hitachi, Ltd.; Hitachi Automotive Engineering Co., Ltd., both of Tokyo, Japan

[21] Appl. No.: 369,028

[22] Filed: Apr. 16, 1982

[30] Foreign Application Priority Data

Apr. 20, 1981 [JP] Japan .................................. 56-58515

[51] Int. Cl.³ .............................................. F02M 59/20
[52] U.S. Cl. ...................................... 123/357; 123/501; 123/500
[58] Field of Search ............... 123/357, 501, 502, 450, 123/500; 417/462

[56] References Cited

U.S. PATENT DOCUMENTS

| | | | |
|---|---|---|---|
| 3,107,661 | 10/1963 | Kemp | 123/502 |
| 3,796,197 | 3/1974 | Locher et al. | 123/357 |
| 4,019,478 | 4/1977 | Hobo et al. | 123/502 |
| 4,180,037 | 12/1979 | Hobo et al. | 123/357 |
| 4,368,705 | 1/1983 | Stevenson et al. | 123/357 |

FOREIGN PATENT DOCUMENTS 2041577A 9/1980 United Kingdom ................ 123/357

Primary Examiner—Charles J. Myhre
Assistant Examiner—Magdalen Moy
Attorney, Agent, or Firm—Antonelli, Terry & Wands

[57] ABSTRACT

A method and a system are disclosed for controlling the amount and advance of fuel injection of a diesel engine using an injection pump of the type which defines the fuel supply period and the compression period, alternately, in synchronism with explosion-exhaustion and intake-compression strokes of each cylinder of the engine, and includes first and second pressure chambers to be supplied with fuel through first and second electromagnetic valves, respectively, during the fuel supply period, and the fuel in the amount equivalent to the fuel amount supplied to said second pressure chamber being injected into the cylinder at an injection timing determined from the total amount of the fuel supplied to said first and second pressure chambers. The open time intervals of the first and second electromagnetic valves are determined from the fuel amount to be injected into each cylinder and the injection timing advance which are determined in accordance with the engine operating conditions. The opening starting time points of the electromagnetic valves are selected in such a manner as to open the two valves for the above-determined time intervals respectively within the fuel supply period and to minimize the overlap of the open times of the two valves.

9 Claims, 10 Drawing Figures

FUEL INJECTION CONTROL SYSTEM FOR ELECTROMAGNETIC VALVE-CONTROLLED FUEL INJECTION PUMP OF DIESEL ENGINE

The present invention relates to a fuel injection control system for an electromagnetic valve-controlled fuel injection pump of a diesel engine, or more in particular to a system for electrically controlling the fuel injection amount and the injection timing of a fuel injection pump.

It is well known that the diesel engine does not use any spark plug but a spray of fuel is injected into a cylinder when the air therein is compressed to high temperature and high pressure, which cause ignition and explosion of the injected fuel thereby driving the piston. The ignition timing thus depends on the time of fuel injection into the cylinder. In the diesel engine, like an ordinary gasoline engine, the ignition timing is desired to be advanced in accordance with the rotational speed of the engine and the load or the amount of fuel to be injected. This advancement of the ignition timing is accomplished by advancing the fuel injection timing by the fuel injection pump. Since fuel must be injected into an air of considerably high pressure in the case of the diesel engine, however, it is difficult for the fuel injection pump of the diesel engine to use a fuel injection electromagnetic valve for directly contolling fuel injection in a similar manner to that in a gasoline engine. For this reason, the diesel engine conventionally uses a mechanical regulating means exclusively for attaining a desired injection timing of the fuel injection pump. Recently, however, a system capable of electromagnetically controlling the fuel injection amount and injection timing of a high-pressure fuel injection pump has been developed as disclosed in U.S. patent application Ser. No. 304,359 entitled "Injection Pump", assigned to the same assignee as that of the present application and filed on Sept. 7, 1981 as claiming the convention priority based on Japanese Patent Application No. 130684/80 filed Sept. 22, 1980. This injection pump has two pressure chambers, and the amount of fuel supplied to each pressure chamber is adjusted by an electromagnetic valve thereby to regulate the fuel injection amount and fuel injection timing from the fuel pump. If this type of fuel injection pump is used with a diesel engine, it is possible to electrically control the amount and timing of fuel injection into the cylinders.

Accordingly, it is an object of the present invention to provide a method and an apparatus for electrically controlling the amount and timing of fuel injection in a diesel engine by use of an electromagnetic valve-controlled fuel injection pump.

The features and advantageous effects of the present invention will be well understood from the following description of an embodiment with reference to the accompanying drawings in which.

Figure 1:
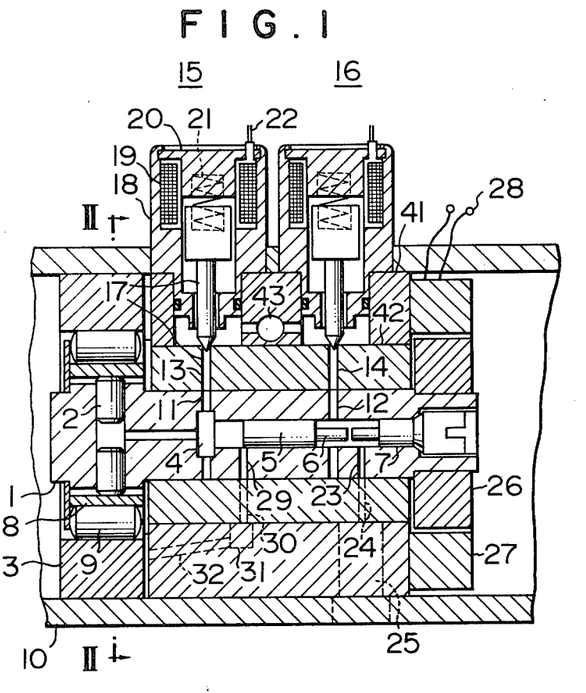
FIG. 1 is a sectional view of an electromagnetic valve-controlled fuel injection pump.
Figure 2:
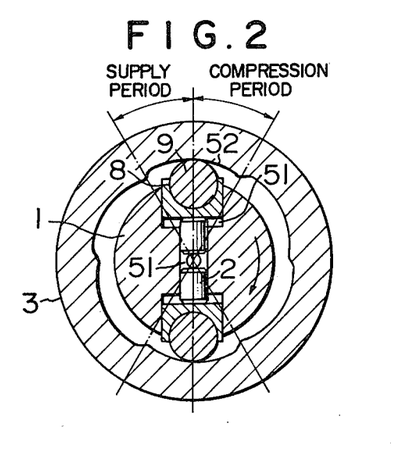
FIG. 2 is a sectional view taken in the line II—II in FIG. 1.

With reference to FIGS. 1 and 2, the construction of the fuel injection pump as disclosed in the prior U.S. patent application and also used for the present invention will be described. In the drawings, a rotor 1 rotates in synchronism with a diesel engine by a drive shaft (not shown). An end of the rotor 1 is formed with a through hole along the diameter, the through hole having a cylindrical central portion 50 and opposite end portions 51 with a rectangular section. In the central portion 50, are mounted a pair of radially-slidable plungers 2, and in each end portion 51 is mounted a radially-slidable roller shoe 8. The outside of the roller shoe 8 is formed with a recess with a semicircular section for receiving a cylindrical roller 9. On the other hand, a cam ring 3 is fixed on that portion of a housing 10 which is radially opposed to the rollers 9. The inner surface of the cam ring 3 is divided equally into a plurality of circumferential sections 52 correspondingly to the respective cylinders of the engine as shown in FIG. 2, each section being inclined to progressively decrease in its inner radius, i.e. the distance from the rotor center, in the rotational direction. At the central part of the housing 10, a sleeve 42 for rotatably supporting the rotor 1 is secured to the housing by a sleeve holder 41. The rotor 1 is formed with a cylindrical chamber having one end communicating with the central portion 50 of the radial through hole and the opposite end hermetically sealed by a stopper 7. An axially slidable free piston 5 in close contact with the inner wall of the cylindrical chamber is arranged in the cylindrical chamber thereby to divide the cylindrical chamber into the left and right spaces as viewed in FIG. 1. The left space with the central portion 50 of the through hole provides a first pressure chamber 4 and the right space provides a second pressure chamber 6.

The rotor 1 rotates in synchronism with the engine as defining alternately a fuel supply period and a compression period corresponding to explosion-exhaustion and intake-compression strokes, respectively. The positions of the rollers 9 of the rotor 1 opposing to the first half and second half of each section 52 of the cam ring 3 respectively correspond to the supply period and the compression period. FIG. 1 shows the position corresponding to the supply period. The sleeve 42 includes a first fixed path 13 and a second fixed path 14. During the supply period, one end of the first fixed path 13 communicates with one of first radial paths provided to the rotor 1 as many as the cylinders, and extending radially from the first pressure chamber 4 while one end of the second fixed path 14 communicates with one of second radial paths 12 also provided to the rotor as many as the cylinders and extending radially from the second pressure chamber 6. The other ends of the first and second fixed paths 13 and 14 make up part of the first and second electromagnetic valves 15 and 16 respectively.

Each of the electromagneitc valves 15 and 16 includes a case 18, a solenoid 19 and armature 17 mounted vertically movably in the case 18. The armature 17 is biased downward by a spring 21 to close the other end of the fixed path 13 or 14. When the solenoid 19 is energized by electric power supplied through a terminal 22, the armature 17 moves upward against the spring force and opens the other end of the fixed path 13 or 14, so that the fixed path 13 or 14 communicates with a fuel supply path formed by the case 18 and the sleeve holder 42. Under this condition, the fuel pressurized by a pump (not shown) driven by an appropriate motor or engine and properly regulated in pressure is supplied to the first or second pressure chamber through a fuel supply port 43, the supply path, the open fixed path 13 or 14 and one of the radial paths 11 or 12 communicating therewith.

Means is provided for detecting a rotational angle of the rotor 1 corresponding to the starting point of the fuel supply period for each cylinder. This means includes a pulser 26 connected with an end of the rotor 1 and rotating in synchronism with the rotor 1 and a detector 27 fixed on the housing. The pulser 26 and the detector 27 are disposed to generate a pulse from the terminal 28 of the detector 27 in a well-known manner when the rotor 1 arrives reaches, during rotation, an angular position corresponding to the starting point of the fuel supply period of each cylinder.

Now, the operation of the fuel injection pump will be explained. In response to a signal generated from the detection terminal 28 at the starting point of a fuel supply period, a control system mentioned later opens the second electromagnetic valve 16 immediately or with an appropriate delay and also the first electromagnetic valve 15 at a time having a specific relationship with the opening time of the second electromagnetic valve 16 as described later. With the opening of the second electromagnetic valve 16, the fuel under an appropriate pressure flows from the fuel supply port 43 though the second fixed path 14 and the second radial path 12 to the second pressure chamber 6. The amount of the fuel flowing into the second pressure chamber 6 depends on the open time length of the second electromagnetic valve 16 and causes the free piston 5 to move to the left side in the drawing. The opening of the first electromagnetic valve 15, on the other hand, causes the fuel to be supplied through the first fixed path 13 and the first radial path 11 into the first pressure chamber 4. At that time, the roller pair 9 is located where the inner diameter of the cam ring 3 is larger, so that the rollers 9 and the roller shoes 8 are movable outward thereby to allow the plunger pair 2 to move outward. Thus, the fuel flows into the first pressure chamber 4 by the amount determined by the open time length of the first electromagnetic valve 15, the size of the fuel supply path and the difference between the fuel pressure at the fuel supply port 43 and the pressure of the first pressure chamber 4. The fuel pressure at the fuel supply port 43 depends on the engine rotational speed if the fuel pump is driven by the engine, and the plungers 2 are subjected to the centrifugal force dependent on the engine rotational speed. Taking these effects into consideration, the characteristic of the fuel supply amount to the first pressure chamber 4 with respect to the open time of the first electromagnetic valve is preliminarily determined, thus making it possible to control the amount of fuel supply to the first pressure chamber 4 by controlling the length of the open time of the first electromagnetic valve 15. When the first electromagnetic valve 15 is opened, the free piston 5 is already situated at a position where the overflow outlet 29 is closed, because it has been moved leftward by the fuel supplied to the second pressure chamber 6.

Thus, the free piston 5 is moved leftward by a distance determined by the amount of the fuel supplied to the second pressure chamber 6, and the plungers 2 are moved outward by a distance determined by the amount of total fuel supplied to the first and second pressure chambers.

With a further rotation of the rotor 1 under this condition, the compression period is initiated. During the compression period, the overflow port 29, which is formed in the rotor 1 and opened to the first pressure chamber 4 if not closed by the free piston 5, communicates with one of the overflow paths 30 formed in the sleeve 42 as many as the same number as the cylinders. The overflow paths 30 are coupled to a common path 31 which communicates through a drain path 32 to the low pressure side of the fuel pump. As an alternative, the rotor 1 may be provided with overflow ports as many as the cylinders, and one of the overflow ports is connected with a common overflow path formed in the sleeve to be directly coupled with the drain path 32. A discharge path 23 in the rotor 1 led from the second pressure chamber 6 communicates with one of the output paths 24 provided in the sleeve 41 as many as the cylinders. Each output path is led to the injection valve of an associated cylinder through a joint opening 25 formed in the sleeve holder and through an appropriate piping system.

The communication between the first radial path 11 and the first fixed path 13 and the communication between the second radial path 12 and the second fixed path 14 which were established during the fuel supply period are both cut off during the compression period.

When the rotor 1 is rotated in this construction, the cam ring 3 compresses the plungers 2 inward through the rollers 9 and the roller shoes 8.

The fuel in the first pressure chamber 4 is compressed to high pressure, and since the overflow port 29 is closed by the side of the free piston 5, the fuel in the second pressure chamber 6 is also compressed to high pressure by the free piston 5, so that fuel is discharged into the cylinder from the injection valve connected to the second chamber through the discharge path 23, the output path 24 and the joint opening 25.

With the discharge of fuel, the free piston 5 is moved rightward, and soon later, the overflow port 29 is opened, so that the subsequent fuel discharge by compression is effected from the overflow port 29 entirely to the pump low pressure side.

In the next fuel supply period, the free piston 5 is moved leftward by a distance corresponding to the amount of fuel supplied to the second pressure chamber 6, and the supplied fuel is injected into the next cylinder in the compression period until the overlow port 29 is opened. The amount of fuel supplied to the second pressure chamber 6 thus provides the amount of fuel injection. The amount of fuel supplied to the first pressure chamber 4 affects the fuel injection timing. This will be explained with reference to FIG. 2.

The cam ring 3 is fixed and includes portions for defining the compression period and portions for defining the fuel supply period alternately. This cam ring has such an inner cam shape that as the rotor 1 angularly moves clockwise, the roller shoes 8 and the rollers 9 progressively urges the plungers 2 inward during the compression period, and the outward movement of the plungers 2 together with the roller shoes 8 and the rollers 9 is not prevented during the fuel supply period. When a large amount of fuel is supplied to the first and second pressure chambers 4 and 6 during the fuel supply period, the distance of outward movement of the plungers 6 is also large so that the contact between the inner side of the cam ring 3 and the rollers 9 begins in an early stage of the compression period, thus starting the compression and discharge of fuel at an early time.

In this way, the amount of fuel supplied to the second pressure chamber 6 makes up the amount of fuel injection as mentioned above. Suppose the overflow port 29 is omitted and that the amount of fuel supply to the first pressure chamber 4 is zero. The fuel injection will end when the rollers 9 reach the point of minimum diameter of the inner side of the cam ring 3. In other words, the fuel injection will end always at a fixed angular position of the rotor 1, while the fuel injection will begin earlier for larger amount of fuel injection. If fuel is also supplied to the first pressure chamber 4, the fuel injection start timing is advanced according to the amount of fuel supply. Further, even after the fuel supplied to the second pressure chamber 6 is wholly injected, the fuel supplied to the first pressure chamber 4 will continue to be compressed for a period of time corresponding to fuel supply amount. In order to prevent this inconvenience, the overflow port 29 is provided. Specifically, the overflow port 29 is located at a position selected such that when the fuel injection is started at a timing determined by the total amount of fuel supplied to the first and second pressure chambers 4 and 6, the blocking of the overflow port 29 by the free piston 5 terminates when the fuel supplied to the second pressure chamber 6 is wholly injected. As a result, during the remaining compression period, the fuel remaining in the first pressure chamber is discharged from the overflow port 29.

As mentioned above, the fuel flowing into the second pressure chamber 6 through the second electromagnetic valve 16 acts to urge the free piston 5 leftward and the plungers 2 outward. The fuel flowing into the first pressure chamber 4 through the first electromagnetic valve 15 acts to urge the free piston 5 rightward and the plungers 2 further outward. If fuel is supplied to the first pressure chamber 4 and the second pressure chamber 6 at the same time, therefore, the leftward movement of the free piston 5 may be delayed and unless the fuel supply timings for both the pressure chambers are shifted from each other, the fuel may not be supplied to the pressure chambers by amounts corresponding to the respective open time intervals of the electromagnetic valves. Therefore, it is desirable to supply fuel to the first pressure chamber 4 after fuel has been supplied to the second pressure chamber 6. In that case, however, fuel supply to the first pressure chamber 4 may not be completed during the fuel supply period at high engine speed. In order to overcome this problem, after determining the fuel supply amounts to the respective pressure chambers and the lengths of open time intervals of the first and second electromagnetic valves, the opening start time of the first electromagnetic valve 15 is selected to be delayed from the opening start time of the second electromagnetic valve 16 in such a manner as to make the mutual interference between fuel supply to the first pressure chamber 4 and the fuel supply to the second pressure chamber 6 as small as possible so long as the fuel supply to the first pressure chamber 4 is completed within the fuel supply period.

Figure 3:
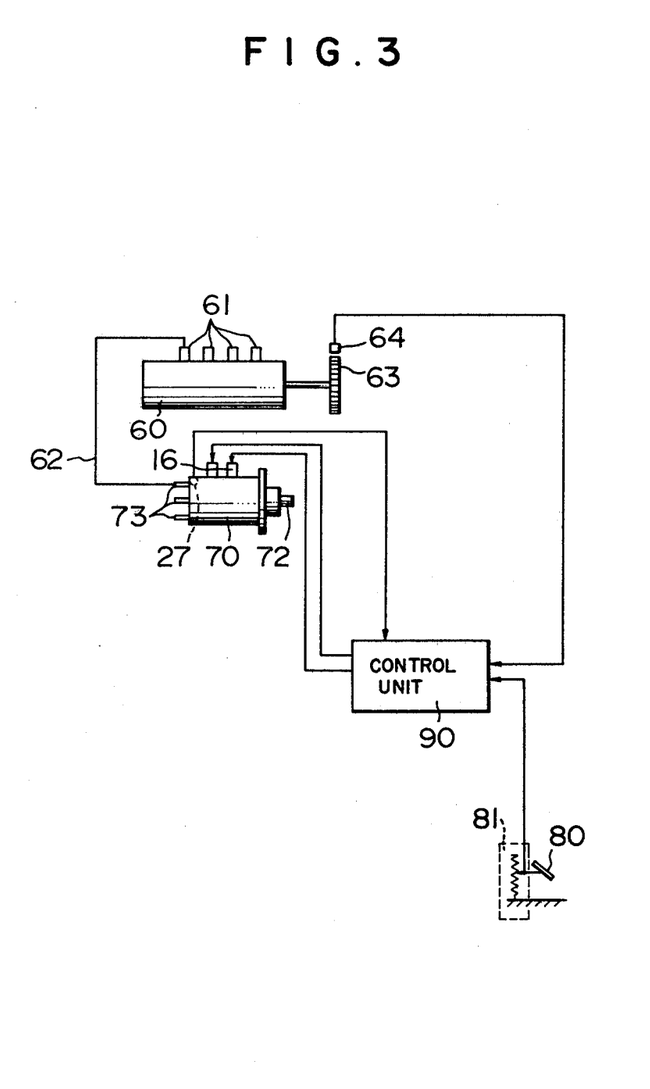
FIG. 3 is a schematic view of a fuel supply system of a diesel engine.

A general configuration of the system used for the present invention is shown in FIG. 3.

In the drawing, a pedal position signal produced by an acceleration pedal position sensor 81 interlinked with an acceleration pedal 80 is applied to a control unit 90. This signal provides a target value of the rotational speed of the diesel engine 60. On the other hand, a pulse signal indicative of an actual engine rotational speed is produced by a rotational speed sensor 64 mounted in proximity to the teeth of the flywheel of the diesel engine 60 and applied to the control unit 90. The control unit 90 is also supplied with an output signal from a sensor 27 indicating the starting point of the fuel supply period shown in FIG. 1. A resultant output from processing these signals is applied to the electromagnetic valves 15, 16 of the fuel injection pump 70 so that fuel is supplied under regulated pressure to the fuel pump, which in turn field the supplied fuel to one of injection nozzles 61 through an injection pipe 62 and a valve 73. The drive shaft 72 is rotated at a speed one-half of the engine rotational speed of the diesel engine 60.

Figure 4:
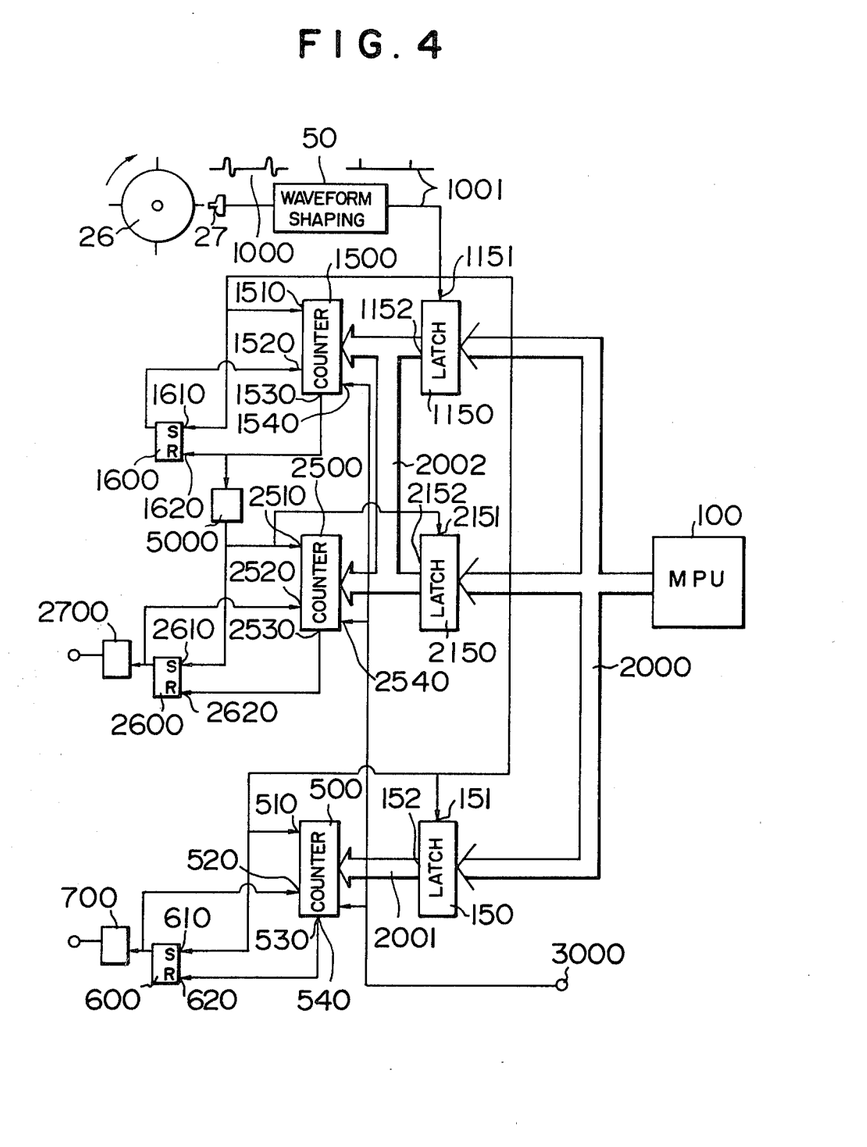
FIG. 4 is a block diagram showing a circuit configuration of a control system according to the present invention.

An embodiment of the fuel injection control system according to the present invention is shown in FIG. 4.

Figure 7A:
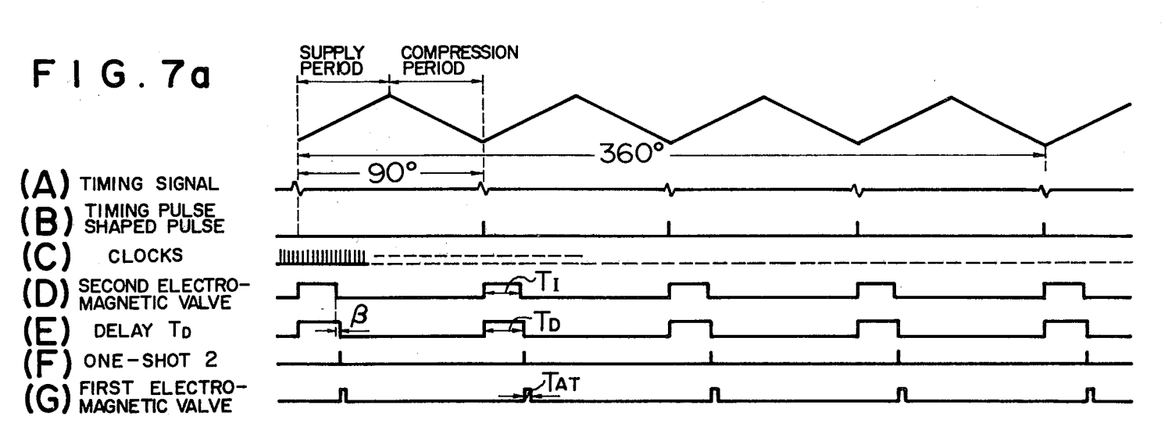
FIGS. 7a and 7b are diagrams for explaining the operating timing of the control system of FIG. 4.

In the drawing, numeral 26 designates a pulser having, for example, four protrusions on the other periphery of a wheel for a four-cylinder engine. Numeral 27 designates a sensor for producing a signal indicative of the starting point of the fuel supply period of the rotor of the fuel pump as mentioned above. The timing signal 1000 as shown in (A) of FIG. 7a produced from the sensor 27 is shaped into a timing pulse 1001 as shown in (B) of FIG. 7a in the waveform shaping circuit 50.

First, the control of open time interval of the first electromagnetic valve 15 of FIG. 1, that is, the electromagnetic valve for controlling the advance angle will be explained. The timing pulse 1001 is applied to a data supply control terminal 1151 of a timing latch circuit 1150, a drive terminal 1510 of a counter 1500 and a set terminal 1610 of a flip-flop 1600. Data for the delay time in opening of the advance angle-control electromagnetic valve is computed by a microcomputer MPU 100 provided in the control unit 90 of FIG. 3 as mentioned in detail hereinafter is supplied through a data bus 2000 and stored in the latch circuit 1150, which sets the stored time delay data in the counter 1500 upon receipt of the timing pulse 1101 at the data supply control terminal 1151. Upon receipt of the timing pulse 1001 at the set terminal 1610, the flip-flop 1600 is set to make the output signal thereof applied to the reset terminal 1520 of the counter 1520 high level "1" thereby to make the counter ready for counting. In response to the timing pulse 1001 at the drive terminal 1510, the counter 1500 starts counting the clock pulses 3000 as shown in (C) of FIG. 7a applied to the clock terminal 1540. Upon counting a number of the clock pulses corresponding to the delay time data, the counter 1500 produces an output signal from the output terminal 1530. This output signal is shaped into a pulse as shown in (F) of FIG. 7a by a monostable multivibrator 5000, and the shaped signal is applied as an opening start timing signal for the advance-control electromagnetic valve to the set terminal 2610 of the flip-flop 2000, the data supply control terminal 2151 of the valve open time length latch circuit 2150 and the drive terminal 5210 of the counter 2500. The output signal 1530 of the counter 1500 is applied to the reset terminal of the flip-flop 1610 thereby to change the output signal of the flip-flop 1620 applied to the reset terminal 1520 of the counter 1500, to the low level "0". The counter 1500 then stops its counting operation and the content thereof is reset to "0".

When the valve opening timing signal derived from the multivibrator 5000 is applied to the set terminal 2610 of the flip-flop 2600, the flip-flop 2600 produces an output signal of high level "1", which makes the counter 2500 ready for counting and at the same time causes the drive circuit 2700 to energize the solenoid of the advance-control electromagnetic valve 15 thereby to open the electromagnetic valve.

The latch circuit 2150 stores data for the open time interval of the advance control electromagnetic valve computed by the MPU 100 as mentioned later, and upon receipt of the valve opening timing signal at the control terminal 2151, sets the stored data in the counter 2500. In response to the timing signal applied to the drive terminal 2510, the counter 2500 starts counting the clock pulses 3000 applied to the clock terminal 2540. When the count of the counter 2500 reaches a value corresponding to the time interval data set in the above-mentioned manner, an output signal is produced from the output terminal 2530. This output signal is applied to the reset terminal 2620 of the flip-flop 2600, which changes its output signal to low level "0", so that the drive circuit 2700 closes the advance-control electromagnetic valve. By resetting the flip-flop, the signal applied to the terminal 2520 of the counter 2500 is changed to low level "0" and the counting operation of the counter 2500 is stopped thereby to reset the contents thereof to "0". In this manner, the start and end timings of the open time interval of the advance-control electromagnetic valve are controlled.

Now, explanation will be made of the open time control of the injection fuel amount control valve, namely, the second electromagnetic valve 16 in FIG. 1. The timing pulse 1001 is applied to the data supply control terminal 151 of the timing data latch circuit 150, the drive terminal 510 of the counter 500 and the set terminal 610 of the flip-flop 600. The latch circuit 150 receives through the data bus 2000 and stores data for the open time interval of the injection fuel amount control electromagnetic valve 16 computed by the MPU 100 as mentioned later, and upon receipt of the timing pulse 1001 at the control terminal 151, sets the particular data in the counter 500. The counter 500, upon receipt of the timing pulse 1001 at the drive terminal 510, begins to count the clock pulses 3000 applied to the clock terminal 540, and when the count thereof reaches a value corresponding to the set time interval data, produces an output signal from the output terminal 530.

In response to the timing pulse 1001 applied to the set terminal 610, the flip-flop 600 produces a signal of high level "1", and causes the drive circuit 700 to energize the solenoid of the fuel amount control electromagnetic valve 16 thereby to open the electromagnetic valve 16. When an output signal of the counter 500 is applied to the reset terminal 620, on the other hand, the output signal is changed to low level "0", so that the drive circuit 700 closes the electromagnetic valve 16. When the output signal of the flip-flop is changed to low level, the counter 500 stops counting the clock pulses and resets the contents thereof to "0". In this way, the start and end timings of the valve open time length of the injection amount control electromagnetic valve 16 are controlled.

Figure 5:
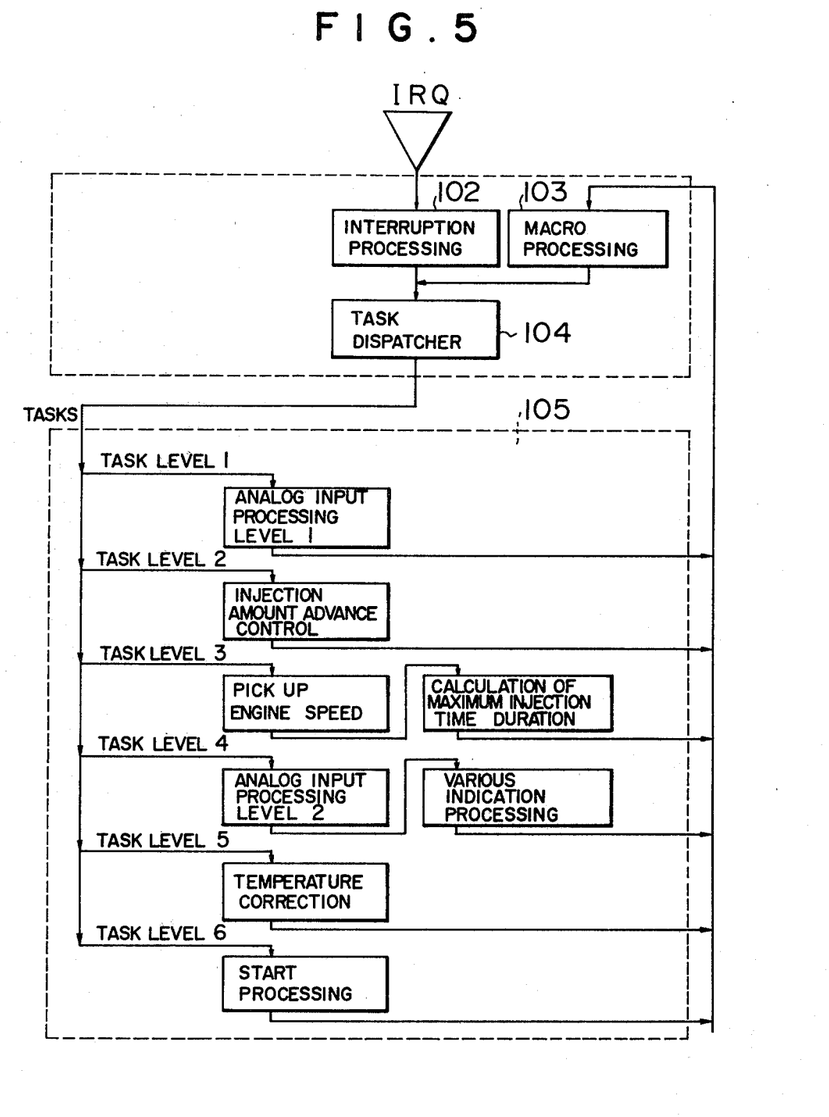
FIGS. 5 and 6 are flowcharts of the operation of a microcomputer used with the control system of FIG. 4.

A flowchart of a general processing operation by the microcomputer MPU 100 is shown in FIG. 5. With the start of the system operation, the microcomputer MPU 100 executes initializing process such as clearing the data in RAM, setting the initial values of the registers of the input-output interface circuit, and storing input data including the cooling water temperature and battery voltage for pre-processing required for engine control. Then, the microcomputer MPU 100 becomes ready for processing the various interruption demands IRQ 101. The flowchart for the initializing process is not shown in FIG. 5. The interruption processing program 102 receives various interruptions, analyzes the types of interruption, and applies a start demand for starting the required one of the task 105 to the task dispatcher 104. The types of interruption include an A/D conversion interruption (ADC) generated after completion of the A/D conversion of input data, an initial interruption (INTL) generated in synchronism with the engine rotation, and an interval interruption (INTV) generated at a predetermined interval of, say, 10 ms.

A group of tasks 105 are assigned with task numbers representing the order of priority.

In response to the various interruption demands, the task dispatcher 104 determines the task to be processed by the MPU on the basis of the priority order assigned to the respective tasks corresponding to the interruption demands.

Upon completion of a task processing program determined by the task dispatcher, the macro processing program 103 transmits this information to the task dispatcher 104. On the basis of this information, the task dispatcher 104 determines the next processing task.

Figure 6:
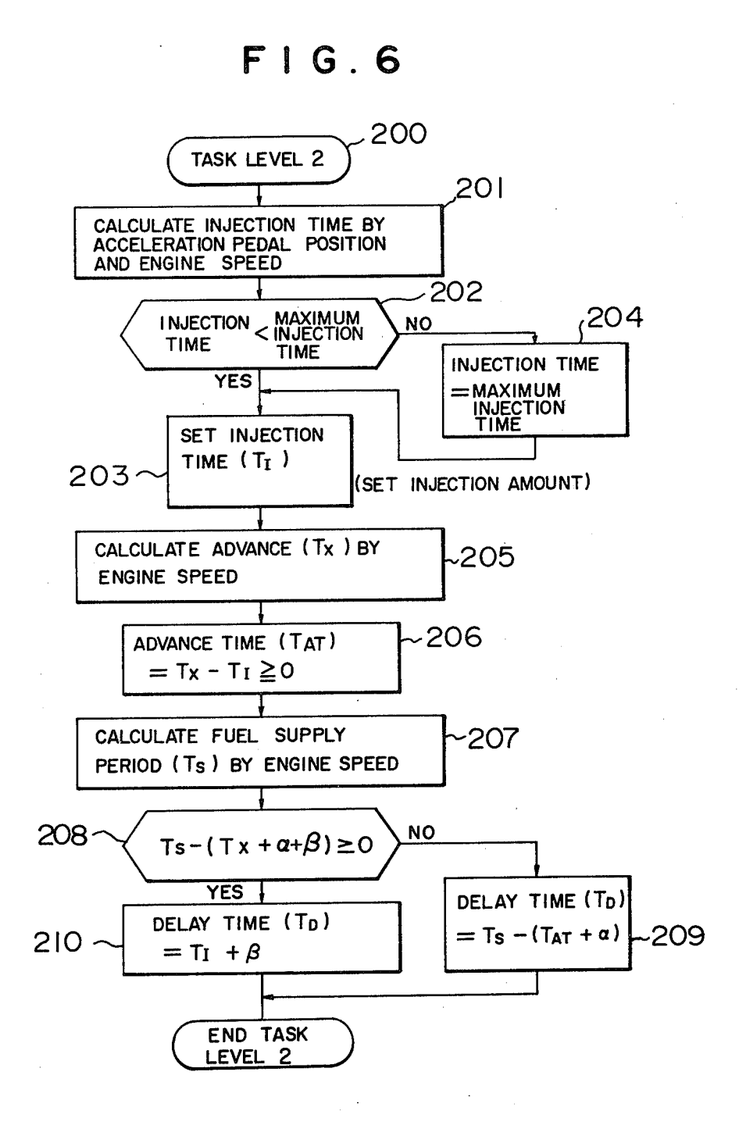

Now, the processing flow of the task 2 relating to the control of amount of fuel injection and advance in timing thereof according to the present invention will be explained with reference to FIG. 6.

First, in response to a start command of the task level 2 at step 200, the fuel injection amount is determined at step 201. According to the present invention, the fuel injection amount is equal to the fuel amount supplied to the second pressure chamber 6 of the injection pump, which is determined by the open time interval of the second electromagnetic valve 16 (hereinafter called the injection time). This injection time is computed at step 201 and represented by the number of the clock pulses 3000. The injection time may be computed from a map providing a fuel injection amount as a function of the target rotational speed determined from the accelerator position data produced from the acceleration pedal position detector 81 and the actual engine rotational speed produced from the engine rotational speed detector 64. As an alternative, it may be calculated from the difference between the target rotational speed and the actual rotational speed according to a predetermined calculating formula. Such a calculating formula is determined on the basis of the control mode to be used such as proportional control for determining the fuel injection amount proportional to the difference signal based on the engine characteristics, differentiation control using the rate in change of the engine rotational speed or integration control using the integration of the difference signals during a predetermined time interval or a combination thereof. The calculation formula for determining the fuel injection amount is well known and is not described in detail herein. In this way, the fuel injection time is determined. Since the injection pump and the diesel engine gives a specific maximum allowable fuel injection amount, determined depending on the operation condition of the engine, step 202 decides whether or not the computed injection time is shorter than a time corresponding to the maximum allowable injection amount which is calculated and stored on the basis of the current operation condition according to the data stored in the memory. In the case where the comparison at step 202 shows that the computed injection time is longer than the maximum allowable injection time, the injection time is determined to the maximum allowable injection time in step 204. If it is decided at step 202 that the computed injection time is shorter than the maximum allowable injection time, on the other hand, the computed injection time is used as an injection time. Thus determined injection time $T_I$ is set at step 203.

The advance $T_X$ is determined from the advance angle data for various rotational speeds stored in the memory at step 205 in a similar manner. In the injection pump used for the present invention, the advance angle is determined by the total fuel supplied to the first pressure chamber 4 and the second pressure chamber 6, and the total fuel is determined by the sum of the valve open time interval of the first electromagnetic valve 15 and that of the second electromagnetic valve 16. The advance $T_X$ is given as the sum of the open time intervals of the two electromagnetic valves on the assumption that the valve characteristics in relation between the valve open time interval and the injection amount, are the same for the two electromagnetic valves. If the characteristics of the two electromagnetic valves are different from each other, by contrast, it is required to convert the value of the open time interval for one of the electromagnetic valves to an equivalent value of that for the other one. For simplicity, it is assumed here that the characteristics of the two electromagnetic valves are identical. Since the valve open time of the second electromagnetic valve 16, that is, the injection control time $T_I$ is already determined, the open time $T_{AT}$ of the first electromagnetic valve 15, that is, the advance angle control time is calculated as $T_{AT} = T_X - T_I$ at step 206.

Figure 7B:
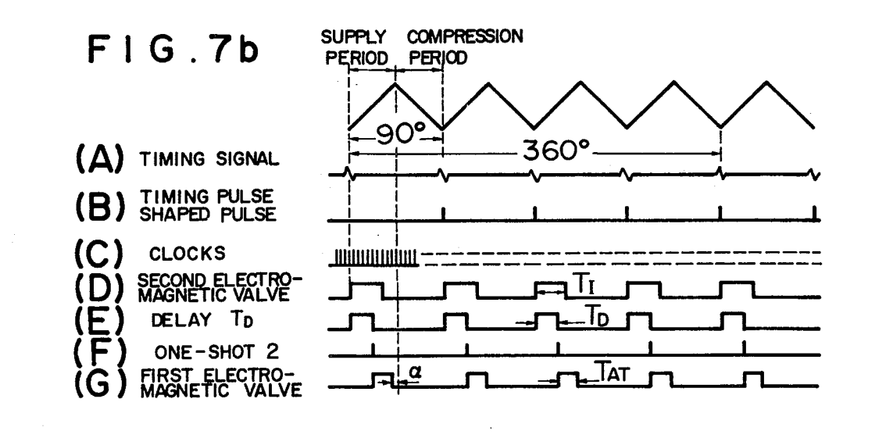

At step 207, the fuel supply period $T_S$ corresponding to the prevailing engine rotational speed is calculated. As mentioned above, it is desirable that the open time of the first and second electromagnetic valves 15, 16 are not overlapped. Thus the step 208 decides whether or not the electromagnetic valves can be opened without overlap for the calculated open times $T_I$ and $T_{AT}$ respectively within the fuel supply period $T_S$. In this case, margin times $\alpha$ and $\beta$ are added to the open times $T_{AT}$ and $T_I$ respectively of the first and second electromagnetic valves. These margin times $\alpha$ and $\beta$ are determined taking into consideration the delay of mechanical operation of the electromagnetic valves and the change of the fuel supply period $T_S$ which may be caused by the change of the engine rotational speed during the period from the time point of execution of the program of task level 2 to the time point of actual operation of the electromagnetic valves. At step 208, $T_S$ is compared with $T_{AT} + \alpha + T_I + \beta = T_X + \alpha + \beta$, and if $T_S - (T_X + \alpha + \beta) \geq 0$, it is judged that the electromagnetic valves can be opened without any overlap of open times and the process proceeds to step 210 for calculating the delay $T_D$ of the opening start time point of the first electromagnetic valve 15 from the opening start time point of the second electromagnetic valve 16 on the basis of $T_D = T_I + \beta$ as shown in (E) of FIG. 7a. If $T_S - (T_X + \alpha + \beta) < 0$, by contrast, it is decided that the electromagnetic valves cannot be opened without overlap, and the process proceeds to step 209, where $T_D$ is calculated from $T_D = T_S - (T_{AT} + \alpha)$ as shown in (E) of FIG. 7b so that the delay time $T_D$ of the valve opening start of the first electromagnetic valve 15 is as large as possible to the extent that fuel supply by the first electromagnetic valve 15 is completed within the fuel supply period $T_S$. In this way, the MPU calculates $T_D$, $T_{AT}$ and $T_I$ at task level 2. These values are stored in the latch circuits 1150, 2150, and 150 in FIG. 5 respectively.

Figure 8A:
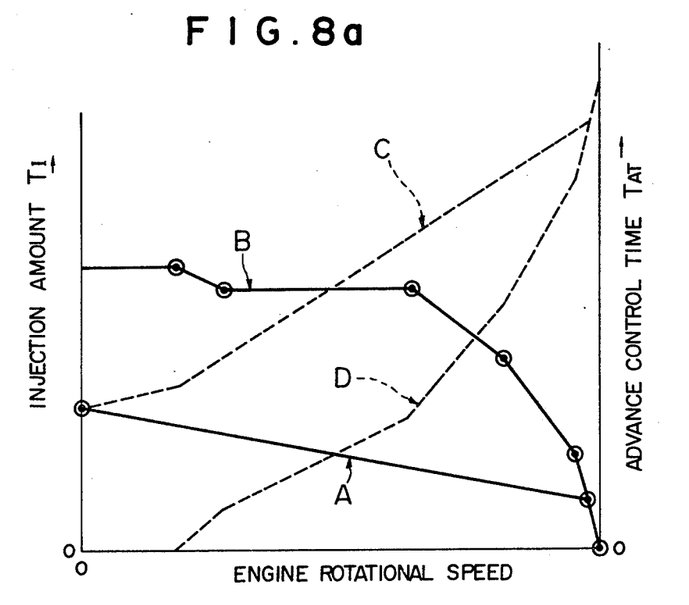
FIGS. 8a and 8b are graphs showing the fuel injection amount and the advance characteristic of fuel injection timing with respect to the engine rotational speed respectively.
Figure 8B:
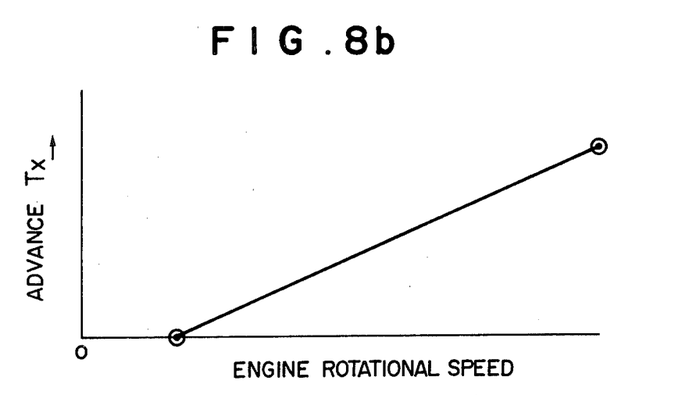

FIGS. 8a and 8b show an example of the values $T_X$, $T_I$ and $T_{AT}$ in the form of linear and polygonal lines as determined from the characteristics of fuel injection amount and advance angle with respect to the engine rotational speed. The straight line A in FIG. 8a represents the value $T_I$ under no load, and the polygonal line B represents the value $T_I$ under maximum load. The polygonal lines C and D, on the other hand, represent the values $T_{AT}$ corresponding to the lines A and B, respectively, obtained as the difference between the value $T_X$ determined from FIG. 8b and the corresponding value $T_I$ determined from the lines A and B. By storing the values at points shown by ⊙, it is possible to determine the values $T_{AT}$ and $T_I$ at given loads and rotational speeds by interpolation.

The aforementioned embodiment has assumed that the first and second electromagnetic valves have the same characteristics in relation between the valve open time and the fuel injection amount and that the fuel injection amount and the injection advance are determined in the term of open time intervals of the corresponding electromagnetic valve. It should be understood, however, modification can be made within the scope of the present invention such that the fuel injection amount and the injection advance may be determined in terms of the amount of fuel supplied to the first and second pressure chambers of the injection pump and the open time of the first and second electromagnetic valves are determined from the characteristics thereof. If the characteristics of the first and second electromagnetic valves are different, the above-mentioned calculation of the open time intervals gives equivalent values thereof applicable if the characteristics are the same and hence those calculated equivalent values are subjected to suitable conversion based on the respective characteristics of the valves before being applied thereto.

We claim:

1. A control system for controlling the amount of fuel injection and the advance of injection timing for a diesel engine using an injection pump of the type which defines fuel supply period and compression period, alternately, in synchronism with explosion-exhaustion and intake-compression strokes, respectively, of each cylinder of the engine, and includes first and second pressure chambers to be supplied with fuel through first and second electromagnetic valves, respectively, during the fuel supply period, fuel in an amount equal to the amount supplied to said second pressure chamber being injected, during the compression period, into the cylinder at an injection timing determined from the total fuel amount supplied to said first and second pressure chambers, said control system comprising:

first means for determining the amount of fuel to be injected into each cylinder and the advance of injection timing thereof in accordance with the operating conditions of said engine;

second means for opening said second electromagnetic valves for a time interval corresponding to the fuel injection amount determined by said first means;

third means for determining the open time interval of said first electromagnetic valve on the basis of the advance of fuel injection timing and the fuel injection amount determined by said first means;

fourth means for determining the delay time of the valve opening start time of said first electromagnetic valve from the opening start time point of said second electromagnetic valve as a function of the open time interval of said second electromagnetic valve corresponding to the fuel injection amount determined by said first means, the open time interval of said first electromagnetic valve determined by said third means and the length of said fuel supply period determined by the engine rotational speed; and fifth means for starting opening of said first electromagnetic valve with said determined delay time from the opening start time point of said second electromagnetic valve and continuing the opening of said first electromagnetic valve for the time interval determined by said third means.

2. A control system according to claim 1, wherein the fuel injection amount and the injection advance timing determined by said first means are represented in terms of the open time intervals of any one of said electromagnetic valves.

3. A control system according to claim 1, further comprising means for generating a signal indicating the starting point of said fuel supply period, and said second means including means for opening said second electromagnetic valve in response to said signal indicating the starting point of said fuel supply period.

4. A control system according to claim 1 or 3, wherein the open time interval of said first electromagnetic valve is determined on the basis of a value obtained by subtracting said fuel injection amount from the total fuel supply amount corresponding to said injection timing advance.

5. A control system according to claim 4, wherein said fourth means includes means for comparing the sum of said open time intervals of said first and second electromagnetic valves with the length of said fuel supply period, and means for determining said delay time when said length of said fuel supply period is larger than said sum by at least a first predetermined value as a value obtained by adding a second predetermined value to said open time interval of said second electromagnetic valve and when said length of said fuel supply period is not larger than said sum by said first predetermined value as a value obtained by subtracting the sum of the open time length of said first electromagnetic valve and a third predetermined value from the length of said fuel supply period.

6. A control system according to claim 5, wherein said first predetermined value is equal to the sum of said second predetermined value and said third predetermined value.

7. A control system according to claim 3, wherein said fifth means includes;

first storage means for storing data representing the delay time determined by said fourth means;

second storage means for storing data representing the open time interval of said first electromagnetic valve determined by said third means;

first counter means for counting predetermined clock pulses in response to a signal indicative of the starting point of said fuel supply period and producing an output signal when the count thereof reaches a value corresponding to the data stored in said first storage means;

second counter means for counting predetermined clock pulses in response to an output signal of said first counter means and producing an output signal when the count thereof reaches a value corresponding to the data stored in said second storage means; and first electromagnetic valve drive means for opening said first electromagnetic valve in response to an output signal of said first counter means and closing said first electromagnetic valve in response to an output signal of said second counter means.

8. A control system according to claim 7, wherein said means includes;

third storage means for storing data representing the open time interval of said second electromagnetic valve corresponding to the fuel injection amount determined by said first means;

third counter means for counting predetermining clock pulses in response to a signal representing the starting point of said fuel supply period and producing an output signal when the count reaches a value corresponding to the data stored in said third storage means; and second electromagnetic valve drive means for opening said second electromagnetic valve in response to a signal representing the starting point of said fuel supply period and closing said second electromagnetic valve in response to an output signal of said third counter means.

9. A method of controlling the amount and advance of fuel injection for a diesel engine using an injection pump of the type which defines fuel supply period and compression period, alternately, in synchronism with explosion-exhaustion and intake-compression strokes, respectively, of each cylinder of the engine, and includes first and second pressure chambers to be supplied with fuel through first and second electromagnetic valve during the fuel supply period, and the fuel in the amount equivalent to the amount supplied to said second pressure chamber being injected during the compression period into the cylinder at an injection timing determined from the total amount of fuel supplied to said first and second pressure chambers, said method comprising the steps of:

determining the amount of fuel to be injected into each cylinder and the injection timing thereof in accordance with the operating conditions of the engine;

determining the open time intervals of said first and second electromagnetic valves from said fuel amount to be injected and said injection timing; and opening said first and second electromagnetic valves for said determined time intervals respectively within said fuel supply period determined in accordance with the engine rotational speed, and determining the opening starting time of said first electromagnetic valve and the opening starting time of said second electromagnetic valve in such a manner as to minimize the overlap of the open time intervals of said first and second electromagnetic valves.

* * * * *